Feb. 17, 1970  C. G. SWAIN  3,496,453
VOLTAGE SENSING DEVICE

Filed April 4, 1967  2 Sheets-Sheet 1

INVENTOR
CHARLES GARDNER SWAIN
BY, Norman E. Saliba
ATTORNEY

INVENTOR
CHARLES GARDNER SWAIN
BY, Norman E. Saliba
ATTORNEY

United States Patent Office 3,496,453
Patented Feb. 17, 1970

3,496,453
VOLTAGE SENSING DEVICE
Charles Gardner Swain, Arlington, Mass., assignor to Ionics, Incorporated, Watertown, Mass.
Filed Apr. 4, 1967, Ser. No. 628,405
Int. Cl. G05f 1/40
U.S. Cl. 323—22                    15 Claims

ABSTRACT OF THE DISCLOSURE

Voltage sensing apparatus in which the presence of a voltage to be sensed at input terminals in excess of a predetermined amplitude enables a storage device to be charged until the portion of the difference between the voltage in the storage device and a reference voltage fed back to the input terminals cancels the voltage being sensed; the larger remainder of that difference voltage is available to drive measuring devices calibrated to indicate the value of the cancellation voltage, thus the voltage sensed; when the voltage to be sensed is below a predetermined amplitude the difference voltage is fed back to create a voltage at the input terminals to cause the storage device to lose charge.

---

This invention relates to an electrical device which is sensitive to changes in voltage. In particular, it is concerned with a device for indicating, amplifying, measuring, and recording changes in voltage or direct current, and for eliminating or lessening such changes by electrical control or regulation of the system in which they originate.

In various chemical processes it is often necessary to control the concentration of hydrogen ion or some other particular species in solution. The use of the present invention, in conjunction with a suitable electrode sensitive to the concentration of the particular species in question, can accomplish such control more simply than previously known methods of equal precision. An embodiment of this invention is described herein which is useful even when the voltage changes are as small as one millivolt and have an associated resistance as large as 1000 megohms. By utilization of the voltage drop across a standard resistor, the voltage sensing device of my invention becomes equally applicable to the control of direct current. The invention may also be used for example to measure, record, or control the conductance of solutions, or used as a millivoltmeter or nanoammeter, or as a null indicator, or as a new type of general-purpose, linear, direct current or voltage amplifier having relatively low noise, high stability, and high amplification in one step.

Prior art devices designed to accomplish such monitoring and control normally incorporate an electrical bridge and an amplifier. The amplifier in turn must be driven with either D.C. or A.C. modulated current. Further, some form of synchronous detection must be provided which in turn leads to a relatively complicated device if a high degree of accuracy is to be obtained. A simpler electrical sensing device is described in my U.S. Patent No. 3,300,622, which is suitable for sensing changes in resistance, capacitance, inductance, or temperature. However, Patent No. 3,300,622 is not adapted for sensing changes in voltage or current because it specifically employs a capacitor or inductor in combination with a resistor to control pulse patterns in both reference and sensing circuits, and thereby to control the output. It is limited to determining differences or changes in resistance, capacitance, or inductance, or changes in a physical property which can affect one of these electrical quantities (e.g., temperature changes, which can affect the resistance of a thermistor or other temperature-sensitive resistor). The invention disclosed herein is adapted for sensing changes in voltage or direct current because, although the aforementioned combinations of a capacitor or inductor with a resistor for control purposes can be omitted, it provides instead for modification of the pulse pattern in the sensing circuit by the voltage to be sensed, supplied as an external input to the sensing circuit.

It is therefore a primary object of this invention to provide a device for sensing changes in an externally supplied voltage, which is simple to construct and operate and which still possesses the accuracy associated with the more complicated comparable devices which are based upon a determination and evaluation of voltage differences. It is equally an object of this invention to provide a simple and accurate device for sensing changes in direct current. (However, this is not considered a distinct or alternate use because a voltage sensing device obviously becomes a current sensing device whenever it is connected across a resistor through which current flows; therefore, all of the uses may be based on changes in either voltage or direct current.) More specifically, it is an object of this invention to provide a device useful for indicating, amplifying, measuring, recording, or regulating changes in either voltage or direct current, or any combination of these five different uses. Other objects of the invention will in part be obvious and will in part be apparent hereinafter.

The simplest use of the invention is for indicating a voltage or current change in excess of a certain value by means of a pilot lamp, buzzer, or other warning device. Regulating the system in which the voltage or current changes originate so as to eliminate or lessen these changes is a more complicated use, discussed further hereinafter in connection with two specific embodiments of this invention. The amplifying, measuring and recording uses are illustrated by the second of the embodiments of the invention hereinafter discussed; these three uses give outputs that are not simply on or off, but are proportional to the externally supplied voltage being sensed.

This invention is best explained and understood by reference to my U.S. Patent No. 3,300,622 wherein there is fully disclosed an electrical sensing device based on the same physical principles as the present invention but there specialized for the application of comparing resistances, capacitances, or inductances or controlling the temperature of a system over a period of time. Both that patented invention and the present invention utilize a pulse technique, with two switches (a reference switch and a sensing switch), and a logic circuit which is electrically responsive only when a predetermined one of these switches closes (or opens) first during each of the rapidly repeating cycles. Thus the order in time of switching is used to govern whether a controlled load receives power or not during each cycle.

The present invention accordingly comprises the several steps and the relation of one or more of such steps with respect to each of the others, and the apparatus embodying features of construction, combinations of elements and arrangements of parts which are adapted to effect such steps all as exemplified in the following detailed disclosure.

For a fuller understanding of the nature and objects of the invention, reference should be had to the following detailed description taken in connection with the accompanying drawings, in which.

Figure 1:
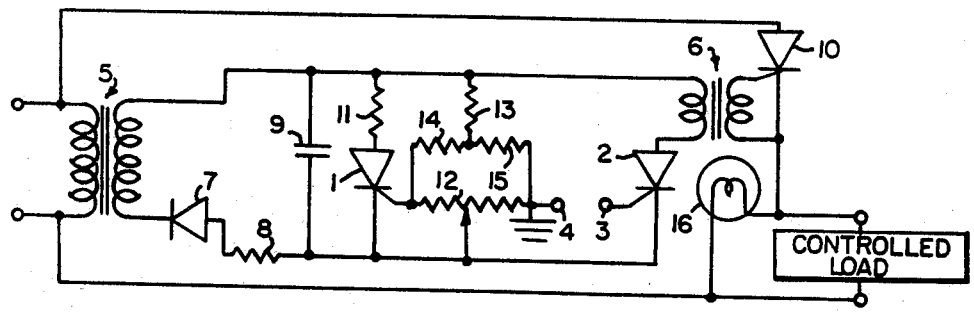
FIG. 1 is a schematic diagram of a cyclical voltage sensing device capable of controlling a load.

FIGURE 1 is a simple embodiment of this invention sufficient to illustrate its regulatory function. The present invention differs from that of U.S. Patent No. 3,300,622 in that it is highly sensitive to voltage (capable of responding reproducibly to input changes of a few millivolts) but is unaffected or only slightly affected by such changes in resistance, capacitance, inductance or temperature as are typically associated with the use of this circuit for voltage control. The voltage on the cathodes of two silicon controlled switches 1 and 2 is again swept during each cycle until one of these two switches becomes conducting. In U.S. Patent No. 3,300,622, the capacitors attached between their cathode gates and cathodes, and the diodes attached to their cathode gates to discharge these capacitors, are omitted or replaced in the present invention by resistors of relatively low resistance. Therefore, which of the two switches 1 and 2 turns on first is determined not as in U.S. Patent No. 3,300,622 by any capacitor or resistor attached to the cathode gate of the switch 2 of the sensing circuit but instead primarily by the small variations in the external voltage being sensed, applied to the gate of switch 2 through input terminals 3 and 4. The circuit of FIGURE 1 also illustrates that the Zener diode formerly used in the power supply of my prior patent may be obviated and, further, the logic and control circuits are considerably simplified.

Transformers 5 and 6 provide isolation of the input voltage from the alternating current power supply and the controlled load. Diode 7 provides current during part of each power supply cycle. The values of resistor 8 and capacitor 9 are chosen to allow one of these two switches (reference switch 1 or sensing switch 2) to turn on early in each cycle, e.g. between 15° and 60° after the beginning of each cycle, with sufficient charge stored in capacitor 9 at that point to trigger the load switch 10 and turn on the controlled load if switch 2 is the switch that turns on. The capacitor is then discharged either through pulse transformer 6 by switch 2 or through resistor 11 by switch 1.

The two switches 1 and 2 can be precisely balanced at zero volts input by variable resistor 12, in combination with fixed resistors 13, 14 and 15. Resistor 12 is adjusted so that the controlled load just turns on or just fails to turn on during each cycle, when input terminals 3 and 4 are connected externally to only a resistor having the resistance of the voltage source (normal input). Then input terminals 3 and 4 are connected instead to the normal input, consisting of the voltage to be sensed in series with a settable known standard voltage from a potentiometer. The potentiometer standard voltage is set equal in magnitude but opposite in sign to the normal value of the voltage which it is desired to sense, so that the controlled load is switched on during each cycle when the voltage to be sensed varies in the direction that makes terminal 3 (the gate of switch 2) positive relative to terminal 4, but remains off whenever it varies in the opposite direction. This decision is made with power supply frequency, e.g., 60 Hz. if the device is powered by an ordinary A.C. supply line. Pilot lamp 16 may be used to provide a visible holding or a load indicator and also to provide sufficient holding current for load switch 10 when the controlled load is small. Components 6 and 10 comprise a logic circuit which is responsive only when switch 2 closes before switch 1. Voltage sensitivity is of the order of one millivolt, and this embodiment is usable with voltage source input resistances up to one megohm. For higher input resistances, the embodiment described hereinafter may be used.

Figure 2:
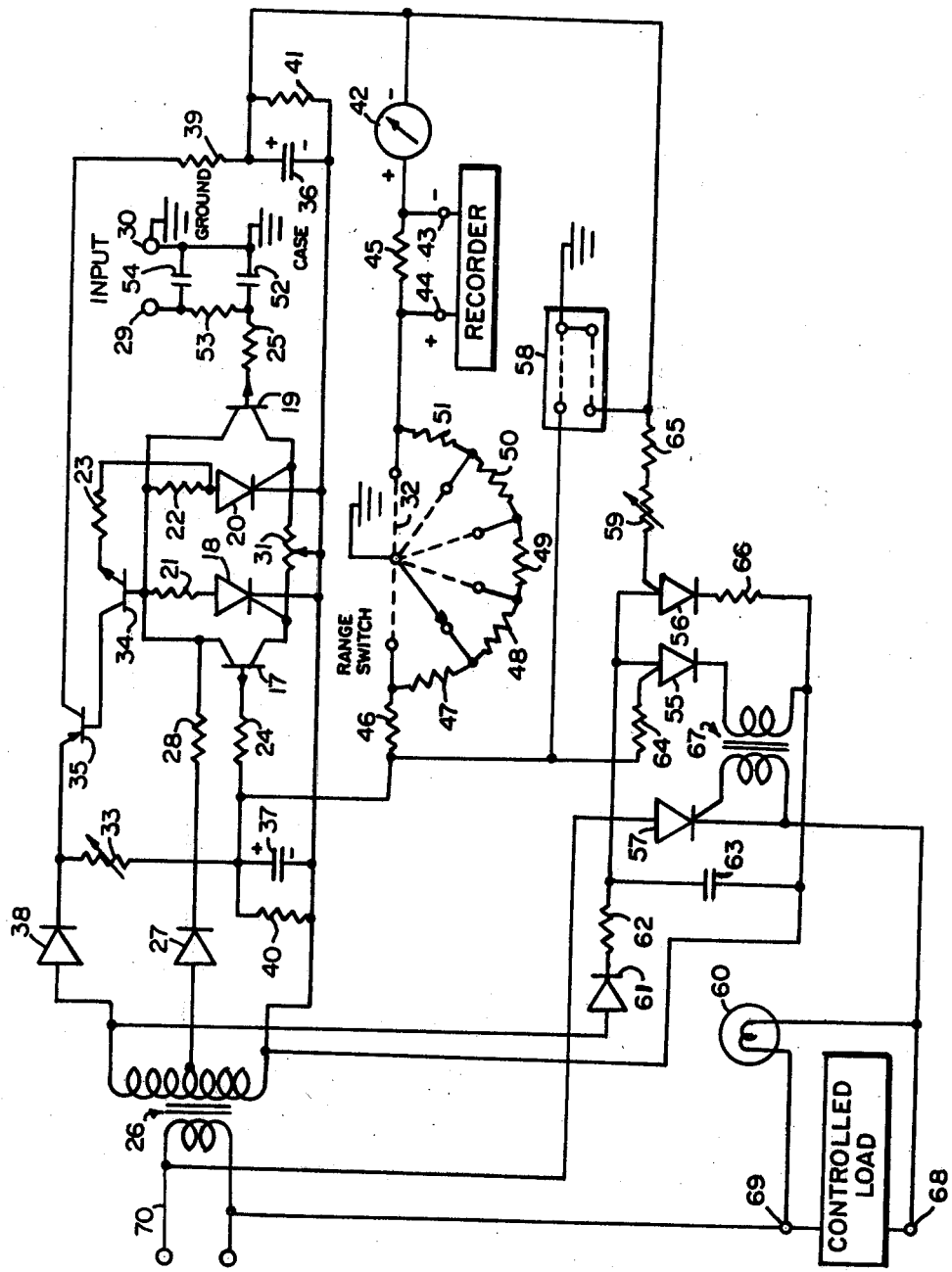
FIG. 2 is a schematic of a cyclical voltage sensing revice capable of driving relatively high power readout devices to indicate the amplitude of small sensed voltages, and of controlling a load in response to the voltage sensed.

FIGURE 2 shows a more versatile embodiment of this invention, suitable for amplification, measurement, and recording, as well as regulation, of voltage changes, which has 1-mv. sensitivity even with voltage source input resistances up to or exceeding 1000 megohms. The higher input impedance is achieved through the use of field effect transistors as parts of both reference and sensing switches.

The reference switch comprises field effect transistor 17 and silicon controlled switch 18; the sensing switch comprises field effect transistor 19 and silicon controlled switch 20. Resistors 21 and 22 may be of equal resistance (e.g., 5000 ohms), but resistor 23 is of much higher resistance to preserve the near equivalence of pulses supplied to the reference and sensing switches. Resistors 24 and 25 may also be high values (e.g., 1 megohm). During each cycle the voltage applied to the source electrodes of transistors 17 and 19 by transformer 26 through diode 27 and resistor 28 sweeps in a positive direction (e.g., from zero to +5 volts) until it passes the cutoff voltage for either transistor 17 or 19. The cutoff voltage for transistor 19 depends on the voltage applied across input terminals 29 and 30. When either field effect transistor 17 or 19 becomes sufficiently conducting, it triggers its associated silicon controlled switch (18 or 20) thereby dropping the source voltage applied to the other field effect transistor and preventing firing of its associated switch during the balance of that cycle. The pulses supplied by transformer 26 and diode 27 may have a frequency of 10 cycles per second or more depending upon the speed of voltage sensing required.

Before use, the reference and sensing circuits are balanced to compensate for slight differences in the field effect transistors and silicon controlled switches, e.g., by adjustment of multiturn potentiometer 31 to set the meter or recorder to zero on the most sensitive (lowest voltage) range of the range switch 32 (to be described hereinafter). Then the meter or recorder can be reset to zero on the least sensitive (highest voltage) range by adjustment of variable resistor 33, thereby ensuring correct balance for all ranges practically independent of power supply voltage variations over a wide range (e.g. 100–130 volts).

When the input voltage (sum of voltage to be sensed and the opposed standard voltage, as described above for FIGURE 1) is negative on terminal 29 relative to case and ground (terminal 30), the sensing switch (instead of the reference switch) turns on during that cycle. Transistors 34 and 35 being high-gain silicon transistors or the like increase the voltage across capacitor 36 when this happens. Capacitors 37 and 36 are charged through diode 38 and resistors 33 and 39, respectively, and discharged through resistors 40 and 41, respectively. However, these capacitors are so large (e.g., 100 microfarads) that they vary little in voltage during the time of one cycle. The difference in voltage between capacitors 37 and 36 may be used to operate a meter 42 (e.g., a D.C. 100 microammeter) or a recorder attached to terminals 43 and 44 (e.g., a D.C. 100 microampere recorder if resistor 45 is omitted or a 100-mv. or 1-volt recorder if an appropriate value for resistor 45 is used). The range switch 32 causes a selected fraction of the voltage difference between positive terminals of 37 and 36, a fraction equal to the difference between the voltage being sensed and the standard voltage, to be fed back as a correction voltage between the positive terminal of 37 and ground; i.e., this error voltage is applied to balance the aforementioned series combination of source voltage and predetermined standard voltage so that null is restored. The voltage between ground and the positive terminal of 36, i.e. across meter and recorder, is automatically maintained at a multiple of this error voltage, selected by the range switch (e.g., from 1 to 1000). This amplification of the voltage difference between the voltage being sensed and the predetermined standard voltage, in addition to the amplification of current, is useful for measuring, recording, and other applications. Resistors 45 to 51 should have a tolerance or precision comparable to that of the meter or recorder used; other resistors and capacitors may have lower tolerance. Capacitor 52 is a small damping capacitor to prevent oscillation (e.g., 2500 picofarads). Resistor 53 (e.g., 100 megohms) and capacitor 54 constitute a simple filter for rejecting interfering A.C. pickup. More selective and efficient filters may be useful when the external voltage source or its lead to input terminal 29 is poorly shielded and its resistance especially high. It is advisable for terminal 30 to be connected to the instrument case, an input cable shield, and a good ground.

Still higher input impedance can be achieved by the use of insulated gate field effect transistors. However, ordinary field effect transistors are adequate up to 1000 megohms even for a 1-mv. range provided that the reference and sensing switches are rebalanced for the range used and the actual voltage source input resistance by readjustment of potentiometer 31 at zero input voltage (to meter or recorder zero or verge of load switching). With insulated gate field effect transistors having much lower gate-source cutoff current, such rebalancing for changing range and source can be avoided. However, with ordinary field effect transistors, rebalancing with adjustable resistor 31 is unnecessary except for highest accuracy or on the lowest voltage ranges (highest sensitivity) with the highest source impedances, and when required is a very simple adjustment. Another alternative to balance a high input resistance to the sensing switch is the use of an equally high resistance in series with resistor 24 to the reference switch. For example, if the input is the voltage from a cell containing a glass electrode in a solution of unknown hydrogen-ion concentration, the voltage from a similar cell, except with a buffer solution of the desired hydrogen-ion concentration, could be applied to the reference switch, thereby also eliminating the need for any other predetermined standard voltage in opposition to the source voltage at the input.

The load at terminals 68 and 69 is controlled by a second null detector which could be a duplicate of that shown in FIGURE 1 or could duplicate the reference and sensing switches with field effect transistors as contained in the first part of FIGURE 2, but instead is shown in FIGURE 2 as a pair of silicon switches 55 and 56 with anode gate firing. This illustrates further the variety of embodiments possible within the scope of this invention, i.e., utilizing the difference in the time at which switching occurs for a reference switch and a sensing switch to control whether a load will be on or off immediately thereafter during each cycle before the next reset. The purpose of this second null detector is to decide the direction (sign) of the error voltage by examination of the whole voltage difference between the positive terminals of capacitors 37 and 36 early in each cycle. Depending on its sign, either switch 55 or 56 fires during that cycle. Only one of these switches (55 as drawn in FIGURE 2) triggers the load switch 57 and thus turns on the controlled load. Before use, the double-pole, single-throw switch 58 is closed momentarily to equalize capacitors 37 and 36 by grounding both of them, and the variable resistor 59 is adjusted until pilot lamp 60 is just barely off (to compensate for small differences in switches 55 and 56); then switch 58 is reopened. Other parts include diode 61, resistor 62, capacitor 63, current limiting resistors 64, 65 and 66 and pulse transformer 67. The logic circuit consists of 67 and 57. Power supply and load terminals are 70, 68 and 69.

The controlled load used with FIGURE 1 or FIGURE 2 may include a motor-controlled valve or pump for adding a chemical reagent as required to return the voltage of a cell containing an electrode sensitive to the concentration of this chemical species to a predetermined standard voltage; or a heater to correct temperature as indicated by a thermocouple; or a motor-controlled variable transformer to regulate current to maintain a desired working electrode potential or cell voltage or voltage drop across a standard resistor; or circuitry for regulating voltage, current or power by means of a mechanical relay or one or more additional silicon controlled rectifiers.

Figure 3:
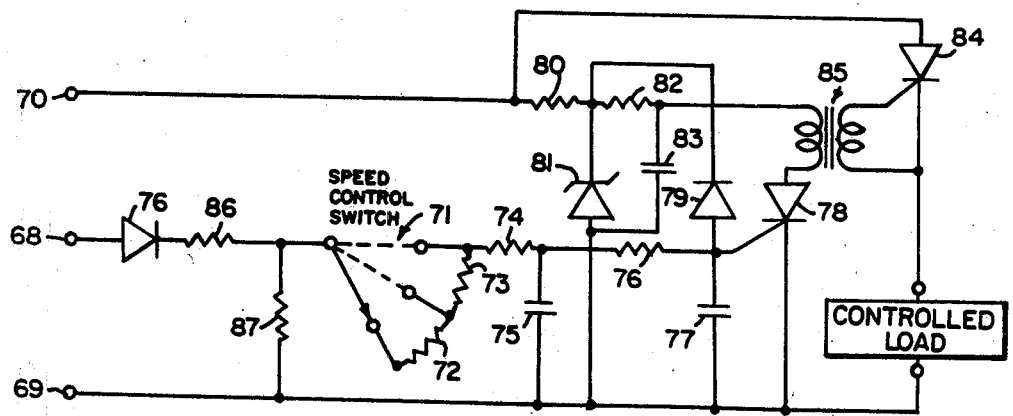
FIG. 3 is a schematic of a circuit similar to that of FIG. 1 which may be controlled by the circuit of FIG. 2 further to control a load in response to voltage sensed.

If it is desired to provide rapid, intermittent, but limited corrections through the regular load output, but also essentially continuous and possibly larger corrections varying more slowly to adjust for seasonal temperature variations or other slow changes, this output can be used also to control the auxiliary phase-controlled output of FIGURE 3. The latter can have a time constant adjustable from less than one second to nearly an hour by the speed control switch 71 which selects the resistors 72, 73 and 74 (e.g. up to 300K ohms) in series with a large capacitance 75 (e.g. 1000 or 10,000 microfarads). Whenever power is applied through terminal 68 and diode 76, the voltage level of 75 slowly increases; otherwise, it slowly falls. The voltage level of 75 together with the high resistance 76 and small capacitance 77 determines how late in each cycle silicon controlled switch 78 is turned on. Diode 79 discharges capacitor 77 before the next cycle. Resistor 80 and Zener diode 81 are an alternative to the transformer and diode used in FIGURES 1 and 2. Resistor 82 and capacitor 83 provide a charge sufficient for triggering load switch 84 through pulse transformer 85.

The output of FIGURE 3 may be connected to correct the system that supplies the voltage to be sensed to the input of FIGURE 2 automatically to approach the condition that the small, fast, intermittent corrections by the controlled load of FIGURE 2 are required and are made only a fixed fraction of the time, i.e. during only half or any other desired fraction of the cycles, corresponding to optimum operation for such intermittent or partly intermittent control. This fraction may be altered, e.g., by changing the values of resistors 86 and 87. As an example of the use of FIGURE 3, the output of FIGURE 3 may be used to maintain any continuous pumping rate, heating rate, motor speed, or current flow at a nearly constant level or value that closely approximates average requirements, while the controlled load of FIGURE 2 is an additional small, intermittent pump or heater or intermittent increment in motor speed or current flow that is turned on an average of half of the time to provide a fine adjustment or correction as required. If external conditions change to require it to be on more than half of the time on the average, the steady output of FIGURE 3 will be slowly increased automatically until the intermittent output of FIGURE 2 is again required on the average only half of the time.

A proportional control output, i.e., a heavy control current nearly proportional to the voltage imbalance (deviation of voltage being sensed from the reference voltage) may be obtained instead of or in addition to the rapid intermittent on-off output and slowly changing continuous output previously described. For this purpose, one may use a means similar to that described for the slowly changing continuous output except that capacitor 75 may be smaller for more rapid response and also a D.C. output signal proportional to average voltage of the load output of FIGURE 3 is fed back in series with the voltage being sensed and the reference voltage so as to restore null input voltage. This D.C. signal for feedback may be obtained, for example, from a transformer with its primary across the load terminals of FIGURE 3 and its secondary connected through a diode and resistor to a capacitor shunted by a variable resistor which supplies this signal. Alternatively, instead of such feedback, one may utilize the voltage difference between the positive terminals of capacitors 36 and 37 (which is proportional to the voltage imbalance) as input signal for any linear power amplifier control device, with or without moving parts. This alternative is facilitated by the fact that this input signal for the linear amplifier may have a voltage which is a large amplification of the voltage imbalance being sensed as well as providing heavier signal current than may be obtainable directly from the voltage source being sensed.

It will be appreciated that FIGURES 1, 2 and 3 are illustrative only and that one skilled in the art may substitute their equivalent in performance without departing from the scope of this invention.

The power supply may be drawn from an A.C. line, D.C. line or batteries. If from a D.C. line or batteries, the necessary alternating or intermittent or pulsating direct current may be furnished by an oscillator or multivibrator circuit or by a mechanical vibrator or buzzer. The rest of the pulse supply means, if using A.C. power, may comprise a resistor and Zener diode as in FIGURE 3, a transformer and diode as in FIGURE 1 and FIGURE 2, a transformer resistor and Zener diode, or a diode; or, if the preceding circuitry supplies intermittent or pulsating D.C., it may comprise either a resistor and Zener diode or no further pulse supply circuitry.

The basic feature of this invention, common to FIGURE 1 and FIGURE 2, is the use in each cycle of the chronology of switching of a reference switch and a voltage sensing switch (which one switches first) or govern whether a particular electrical load is or is not energized during a portion of that cycle, followed rapidly by automatic reset of the switches and a fresh comparison in the next cycle.

In FIGURE 1 and FIGURE 2 only one of these switches is turned on in each cycle. Embodiments equivalent in performance may be constructed in which they are each turned on, but at different times, or in which one or each is turned off instead of on. In FIGURE 1 there is a resistor 8 and a capacitor 9 in the pulse supply means. However, its primary function is to store charge for firing load switch 10, since adequate reference switch and sensing switch pulses could be obtained from only a suitable transformer and diode. In FIGURE 2, no equivalent capacitor is used in the first null indicator; the large capacitor 37 is provided to furnish an essentially constant voltage difference across resistor 40, not a varying one. In the embodiments in FIGURE 1 and FIGURE 2, the predetermined standard voltage is placed in opposition to the source voltage to constitute the input signal to the sensing switch; but the predetermined standard voltage could as well be placed in a balancing position as an input signal to the reference switch. Embodiments equivalent in performance to that of FIGURE 2 can be constructed using N-channel field effect transistors instead of P-channel types. Since field effect transistors are similar to electrometer vacuum tubes in performance, tubes can be used as an alternative to field effect transistors. Similarly, embodiments can be constructed using tunnel diodes or unijunction transistors or tubes instead of silicon controlled switches, for reference and sensing switches. By silicon controlled switch, we refer to a PNPN device with a control gate electrode, but it is known that a PNP transistor can be combined with an NPN transistor to give an equivalent circuit. Also, just as it is possible to combine the elements of two vacuum tubes in one shell, the functions of a field effect transistor may be combined with those of a silicon controlled switch or with other one-, two- or three-junction semiconductor devices in an integrated circuit, or essential elements of both reference and sensing switches may be so combined without departing from the scope of this invention. A tube, relay, Triac or other alternative may replace a silicon controlled rectifier as the load switch.

Full-wave A.C. output for a controlled load may be obtained instead of half-wave output by use of a Triac or pair of suitably connected silicon controlled rectifiers to control the load, in combination with either a full-wave pulse supply means having two or more diodes or else a latching circuit to "slave" the subsequent half cycle of the load voltage to the presence of load voltage during a first half cycle. Earlier firing angles for more nearly sinusoidal output and lesser radio frequency interference may be obtained by giving the pulse supply for reference and sensing switches a leading phase shift, e.g., by use of a capacitor shunting a resistor limiting the current through a Zener diode in the pulse supply means.

A subsidiary feature of this invention is the use of an auxiliary circuit to provide a second output for control which varies only slowly with time but automatically seeks the level that requires the rapidly responsive first output for control to be activated on the average a predetermined fraction of the time. This affords finer control than is obtainable otherwise from a partly intermittent control mechanism, and likewise may be implemented in numerous other ways than the one illustrated in FIGURE 3. For example, the whole of FIGURE 3 might be replaced by a variable transformer or rheostat connected to a highly geared-down reversible motor, wired to turn very slowly in one direction when terminal 68 is energized and very slowly in the opposite direction when it is not.

Proportional control may be obtained by use of an auxiliary circuit with feedback of a D.C. voltage, proportional to the output of the auxiliary circuit, in series with the voltage being sensed and the reference voltage, e.g., from a potentiometer attached to the shaft of a variable transformer or rheostat controlling the load, turned one way by a motor when load switch 57 conducts and the other way when it does not. Alternatively, proportional control may be obtained by a linear power amplifier having as its input a signal which is an amplification of the voltage or current change being sensed, e.g., by use of a voltage recorder mechanism modified to turn a variable transformer or rheostat, or to position the control of a pneumatic device, instead of moving a pen.

I claim:
1. In combination:
    a power source for producing recurring current pulses;
    a load device coupled to said power source through a load switch having a control circuit;
    a first reference voltage source;
    a second source of variable voltage;
    a switching circuit coupled between said power source and the control circuit of said load switch for transmitting sufficient pulse power to said control circuit to close said load switch when said variable voltage manifests a first polarity with respect to said reference voltage and for preventing the transmission of said sufficient pulse power to said control circuit when said variable voltage manifests a second polarity with respect to said reference voltage, said switching circuit including a first threshold device coupled to said control circuit for energizing the control circuit of said load switch upon breakdown when said variable voltage manifests said first polarity with respect to said reference voltage; and
    a second threshold device coupled in shunt with said power source for preventing the breakdown of said first threshold device when said variable voltage manifests said second polarity with respect to said reference voltage, thereby to provide control of energy transmitted to said load on a cycle by cycle basis.

2. The combination as set forth in claim 1 wherein said power source produces current pulses to selectively break down said threshold devices at a frequency of at least 10 cycles a second, thereby to render energization of said load device sensitive to rapid reversals of said polarity.

3. Voltage sensing apparatus comprising:
    a source of electrical energy;
    input terminals for receiving voltage to be measured;
    storage means for storing a voltage representative of the voltage applied to said input terminals;
    a reference voltage source for providing a reference voltage;

switching means, responsive to said voltage to be measured at said input terminals and said reference voltage, for controlling connection of said source of electrical energy to said storage means;

feedback means for providing a predetermined portion of the voltage difference between the voltage in said storage means and said reference voltage at said input terminals.

4. The apparatus of claim 3 in which said source of electrical energy includes a source of cyclical voltage pulses.

5. The apparatus of claim 4 in which said source of cyclical voltage pulses includes an alternating circuit signal source and rectifying means.

6. The apparatus of claim 3 in which said switching means includes a switching circuit responsive to said reference voltage source and said voltage at said input terminals, and a gate circuit responsive to said switching circuit for controlling connection of said source of electrical energy to said storage means.

7. The apparatus of claim 6 in which said switching circuit includes a reference switching circuit responsive to said reference voltage being in excess of said voltage at said input terminals to disable said gate circuit from connecting said source of electrical energy to said storage means.

8. The apparatus of claim 6 in which said switching circuit includes a sensing switching circuit responsive to said voltage at said input terminals being in excess of said reference voltage to enable said gate circuit to connect said source of electrical energy to said storage means.

9. The apparatus of claim 6 in which said gate circuit includes semi-conductor means.

10. The apparatus of claim 7 in which said reference switching circuit includes a field effect transistor responsive to said reference voltage and a semi-conductor switch responsive to said transistor.

11. The apparatus of claim 8 in which said sensing switching circuit includes a field effect transistor responsive to said voltage at said input terminals and a semiconductor switch responsive to said transistor.

12. The apparatus of claim 3 in which said storage means includes a capacitor.

13. The apparatus of claim 3 in which said reference voltage source includes a capacitor.

14. The apparatus of claim 3 in which said feedback means includes voltage divider means for selecting the portion of the voltage difference between said reference voltage and the voltage in said storage means to be fed back to said input terminals.

15. The apparatus of claim 3 in which said feedback means includes means for feeding back a voltage in opposition to the voltage present at said input terminals when the voltage across said storage means exceeds said reference voltage and a reverse voltage when the reference voltage exceeds voltage across said storage means.

References Cited

UNITED STATES PATENTS

| | | | |
|---|---|---|---|
| 3,317,795 | 5/1967 | Steen | 307—252 X |
| 3,341,769 | 9/1967 | Grant | 219—501 |
| 3,353,083 | 11/1967 | Greenberg et al. | 323—22 X |
| 3,357,008 | 12/1967 | Walsh | 307—252 X |
| 3,358,218 | 12/1967 | Halpin | 323—22 |

LEE T. HIX, Primary Examiner

A. D. PELLINEN, Assistant Examiner

U.S. Cl. X.R.

219—497; 307—246; 323—38